United States Patent [19]
White et al.

[11] Patent Number: 5,832,903
[45] Date of Patent: Nov. 10, 1998

[54] FUEL SUPPLY SYSTEM FOR AN INTERNAL COMBUSTION ENGINE

[75] Inventors: Brian R. White; Vince E. Notareschi; Grant W. Hines, all of Stillwater; Brian D. Simpson, Yale; Timothy M. Baer, Stillwater; Matthew W. Jaeger, Stillwater; Daniel E. Clarkson, Stillwater; James Michael Horak, Stillwater, all of Okla.

[73] Assignee: Brunswick Corp., Lake Forest, Ill.

[21] Appl. No.: 866,962

[22] Filed: Jun. 2, 1997

[51] Int. Cl.⁶ .......................... F02M 37/04; F02M 15/00
[52] U.S. Cl. ............................................ 123/514; 123/541
[58] Field of Search .................... 123/510, 514, 123/541, 495

[56] References Cited

U.S. PATENT DOCUMENTS

| | | | |
|---|---|---|---|
| 2,279,530 | 4/1942 | Smith | 48/180 |
| 3,196,926 | 7/1965 | Gartland | 158/36.3 |
| 3,789,819 | 2/1974 | Moulds | 123/32 EA |
| 4,149,698 | 4/1979 | Berenbaum | 123/514 |
| 4,411,239 | 10/1983 | Kelch | 123/541 |
| 4,450,820 | 5/1984 | Haynes | 123/514 |
| 4,454,851 | 6/1984 | Bourbonnaud et al. | 123/514 |
| 4,475,506 | 10/1984 | Riordan | 123/352 |
| 4,479,470 | 10/1984 | Ishida | 123/308 |
| 4,502,450 | 3/1985 | Duprez | 123/514 |
| 4,523,572 | 6/1985 | Staerzl | 123/494 |
| 4,526,152 | 7/1985 | Hideg et al. | 123/478 |
| 4,534,333 | 8/1985 | Slattery | 123/545 |
| 4,643,147 | 2/1987 | Staerzl | 123/357 |
| 4,699,109 | 10/1987 | Hensel | 123/458 |
| 4,702,202 | 10/1987 | Hensel et al. | 123/52 M |
| 4,711,219 | 12/1987 | Staerzl | 123/494 |
| 4,714,067 | 12/1987 | Staerzl | 123/494 |
| 4,732,131 | 3/1988 | Hensel | 123/516 |
| 4,739,742 | 4/1988 | Staerzl | 123/494 |
| 4,809,666 | 3/1989 | Baltz | 123/516 |
| 4,848,283 | 7/1989 | Garms et al. | 123/73 |
| 4,872,438 | 10/1989 | Ausiello et al. | 123/514 |
| 4,917,053 | 4/1990 | Okazaki et al. | 123/52 |
| 4,941,999 | 7/1990 | Noisier | 261/130 |
| 5,024,188 | 6/1991 | Hartke et al. | 123/195 A |
| 5,040,493 | 8/1991 | Gajewski et al. | 123/41.31 |
| 5,085,198 | 2/1992 | Bartlett et al. | 123/514 |
| 5,119,790 | 6/1992 | Olson | 123/516 |
| 5,137,002 | 8/1992 | Mahoney et al. | 123/516 |

(List continued on next page.)

FOREIGN PATENT DOCUMENTS

0656470A1  6/1995  European Pat. Off. .

OTHER PUBLICATIONS

Electronic Fuel Injection (EFI), Mercruiser Service Manual, Part No. 90–806535940, Chapter 5–E (admitted prior art).

Electronic Fuel Injection Multi–Port (EFI/MP), Mercruiser Service Manual, Part No. 90–823225, Chapter 5F (admitted prior art).

*Primary Examiner*—Thomas N. Moulis
*Attorney, Agent, or Firm*—Andrus, Sceales, Starke & Sawall

[57] ABSTRACT

A fuel supply system for a marine propulsion system having an electronically controlled fuel injection system eliminates the need for a vapor separator. The system pumps an excessive amount of fuel through a plumbed fuel supply loop and cools recirculated fuel to cool all the components in the plumbed fuel supply loop, i.e. a continuous duty, constant displacement fuel pump; a pressure regulator; and a water separating fuel filter. Recirculated fuel flows from the pressure regulator to the water separating fuel filter as does make-up fuel from a fuel tank. The fuel stream from the water separating fuel filter flows to the low-pressure side of the fuel pump, which pumps the fuel through the plumb fuel supply loop. A fuel injection portion of the fuel flows to the engine for combustion, while the remaining portion of the fuel is recirculated. The recirculated portion of the fuel is cooled, preferably using a water-cooled heat exchanger. The cooled, recirculated fuel passes through the pressure regulator and repeats recirculation to the water separating fuel filter.

28 Claims, 5 Drawing Sheets

U.S. PATENT DOCUMENTS

| | | | |
|---|---|---|---|
| 5,174,262 | 12/1992 | Staerzl | 123/458 |
| 5,203,306 | 4/1993 | Billingsley et al. | 123/518 |
| 5,309,885 | 5/1994 | Rawlings et al. | 123/509 |
| 5,389,245 | 2/1995 | Jaeger et al. | 210/129 |
| 5,400,750 | 3/1995 | Jaeger et al. | 123/184.47 |
| 5,408,971 | 4/1995 | Jaeger et al. | 123/456 |
| 5,443,046 | 8/1995 | White | 123/438 |
| 5,551,404 | 9/1996 | Bauerle et al. | 123/541 |
| 5,579,736 | 12/1996 | Nakamura et al. | 123/339.11 |
| 5,584,279 | 12/1996 | Brunnhofer | 123/541 |
| 5,586,524 | 12/1996 | Nonaka et al. | 123/73 |
| 5,598,827 | 2/1997 | Kato | 123/518 |
| 5,653,103 | 8/1997 | Katoh | 60/283 |
| 5,669,358 | 9/1997 | Osakabe | 123/509 |
| 5,687,694 | 11/1997 | Kanno | 123/479 |
| 5,711,282 | 1/1998 | Lang et al. | 123/514 |

FUEL SUPPLY SYSTEM FOR AN INTERNAL COMBUSTION ENGINE

FIELD OF THE INVENTION

The invention is a fuel supply system for an electronically controlled fuel injected engine or a carbureted engine in which a recirculated liquid fuel stream is cooled to prevent fuel pump vapor lock. The invention is particularly well-suited for marine applications.

BACKGROUND OF THE INVENTION

The invention was made during the course of ongoing developmental efforts by the assignee on electronic fuel injection systems for internal combustion engines in the marine environment. Previous developments by the assignee include inventions disclosed in U.S. Pat. Nos. 5,389,245; 5,103,793; 5,443,046; 5,400,750; and 5,408,971 which are herein incorporated by reference, as well as other patents which are identified in the Information Disclosure Statement submitted herewith. The fuel supply systems disclosed in the above-incorporated patents work well, however, it is desirable to reduce the cost of the system, as well as improve the packaging and serviceability of the fuel supply system.

The invention involves a fuel supply system using a continuous-duty electric fuel pump. The system is particularly well-suited for inboard and inboard/outboard marine propulsion systems in which the engine is mounted to joists in the bilge of a boat. The fuel supply system supplies fuel from the boat fuel tank to the electronic fuel injection system for the engine. Fuel is provided to the fuel injectors which inject fuel into cylinder air intake runners at a relatively constant pressure above the air intake manifold pressure (e.g., approximately 30 psi above reference manifold air intake pressure). Normally, fuel is pumped to a fuel rail located at the engine to which the fuel injectors are connected. In systems using a continuous-duty, electric fuel pump, a pressure regulator is located at fuel rail downstream of the fuel injectors to regulate the pressure of the liquid fuel supplied to the fuel injectors. The timing and amount of fuel supplied from each injector are controlled electrically by an electronic control unit (ECU). In engines using continuous-duty fuel pumps, excess fuel not injected by the fuel injectors is typically returned to the main fuel tank or to a vapor separator. The electric fuel pump continuously pumps fuel from the vapor separator to the fuel rail.

In order for the pump to catch prime, liquid fuel must be present on the low-pressure side of the pump. The typical vapor separator is located in the fuel line between the fuel tank and the engine, and includes a tank or container into which the fuel is pumped. The purpose of vapor separators is to remove vapor or air from the fuel stream so that liquid fuel is present on the upstream or low-pressure side of the fuel pump. The liquid level within the vapor separating tank is maintained by a float or other liquid level control mechanism. Liquid fuel is pumped from the vapor separating tank to the fuel rail assembly where the fuel is injected by fuel injectors into the air intake stream for each engine cylinder.

Gasoline boils or vaporizes easily at atmospheric pressures, and without a vapor separator to assure the presence of liquid fuel available to the pump, the fuel supply system may become vapor locked (i.e. the pump will be unable to catch prime). Absent a vapor separator, pump vapor lock in an electronic fuel injection system is most likely when the engine is idling due to heat generated in the fuel stream by the electric fuel pump, or likely due to engine heat soak after the engine has been shut down and restarted after a relatively short period of time. While vapor separators having vapor separation tanks are typically used to reduce (and almost eliminate) the possibility of fuel pump vapor lock, a vapor separator is a relatively expensive component for a marine engine.

In order to reduce costs, it is therefore desirable to provide a fuel supply system that is not susceptible to vapor lock, yet does not use a vapor separator. In addition, it is desirable that the components of the fuel supply system be easily serviced and also tightly packaged to the engine.

SUMMARY OF THE INVENTION

The invention is a fuel supply system that eliminates the need for a vapor separator in an electronically controlled fuel-injected marine engine. The system does this primarily by pumping an excessive amount of fuel through a plumbed fuel supply loop, and cooling recirculated fuel not supplied to the engine fuel injectors. The recirculated portion of the fuel is preferably cooled using a water-cooled heat exchanger. The cooled, recirculated fuel stream acts as a cooling fluid for other components located in the plumbed fuel supply loop, i.e. a continuous-duty, constant displacement fuel pump, a pressure regulator, and a water separating fuel filter.

More specifically, the stream of fuel flowing from a water separating fuel filter preferably flows directly to the low-pressure side of the fuel pump. A fuel injection portion of the fuel stream from the fuel pump flows to the engine for combustion while the remaining portion is cooled by the fuel cooler. The cooled, recirculated portion of the fuel stream then flows through the pressure regulator, and returns to the water separating fuel filter. Make-up fuel from a fuel tank also enters the water separating fuel filter to replenish the recirculated fuel stream. While the engine is running, the cooling of the recirculated fuel stream is more than sufficient to lower the fuel temperature at the low-pressure side of the fuel pump to a temperature that greatly reduces the possibility of pump vapor lock. The likelihood of vapor lock at idle is especially low because at idle virtually all of the fuel pumped by the fuel pump and cooled by the fuel cooler is recirculated.

In the preferred system, vapor lock is also minimized for the situation when the engine is initially shut down and later restarted, primarily by insulating the components in the fuel supply system, i.e. fuel pump, fuel cooler, pressure regulator, and water separating fuel filter; and also by mounting these components low on the engine block, where surrounding air temperatures are substantially less than temperatures in the top portion of the engine box.

The preferred embodiment of the invention which is shown in the drawings, not only carries out the above explained functions, but also is packaged compactly and easily serviceable. There are other advantages and features of the invention which are described below in the Detailed Description of the Drawings.

DETAILED DESCRIPTION OF THE DRAWINGS

Figure 1:
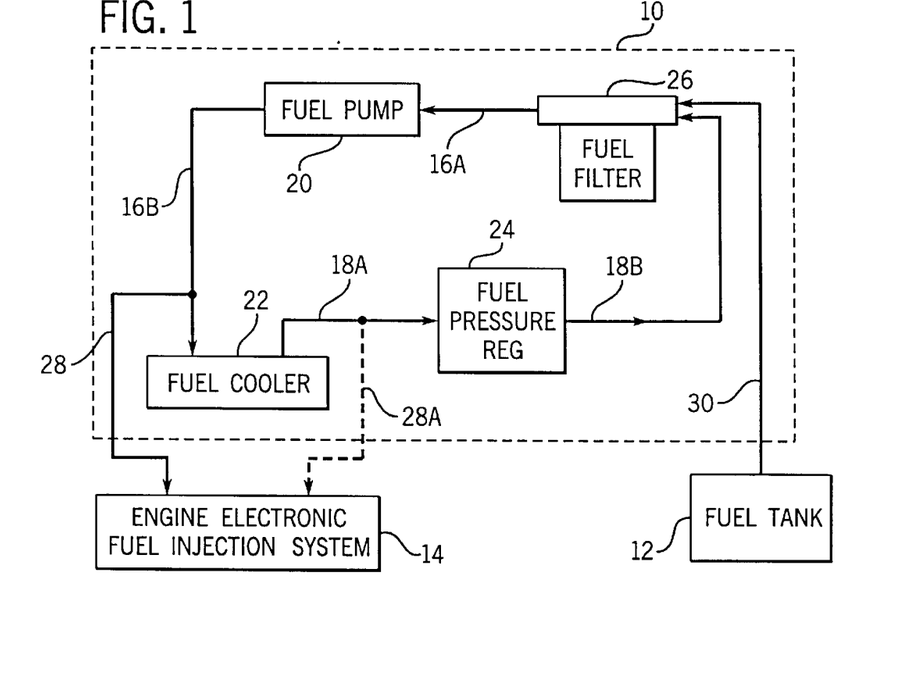
FIG. 1 is a schematic drawing illustrating a fuel supply system for an internal combustion engine in accordance with a preferred embodiment of the invention.

FIG. 1 is a schematic drawing illustrating a fuel supply system 10 in accordance with a preferred embodiment of the invention. The system 10 supplies liquid fuel such as gasoline from a fuel tank 12 to an electronic fuel injection system 14 for an internal combustion engine. The fuel supply system 10 is particularly useful in a marine application.

The fuel supply system 10 uses a plumbed fuel supply loop which includes a main fuel line 16A, 16B and a return fuel line 18A, 18B. A continuous-duty, electric fuel pump 20 is located in the main fuel line between section 16A and 16B of the main fuel line. The electric fuel pump 20 pumps a fuel stream through the fuel supply loop 16A, 16B, 18A, and 18B. A fuel cooler 22 is preferably located between the main fuel line section 16B downstream of the fuel pump 20 and the return fuel line section 18A. The fuel cooler 22 cools the fuel stream flowing through the fuel supply loop 16A, 16B, 18A and 18B. A fuel pressure regulator 24 is preferably positioned in the fuel supply loop downstream of the fuel cooler 22 between sections 18A and 18B of the return fuel line. A water separating fuel filter 26 receives fuel flowing through the return line section 18B from the pressure regulator 24.

Fuel is provided to the electronic fuel injection system 14 for the engine through an engine fuel line 28 at a constant pre-selected amount of pressure above the intake manifold air pressure. The engine fuel line 28 is shown schematically in FIG. 1 to be connected to main fuel line section 16B located between the fuel pump 20 and the fuel cooler 22, however, the engine fuel line may be connected to the fuel cooler 22 (see FIG. 6) or even between the fuel cooler 22 and the fuel pressure regulator 24 (i.e. line 28A tapped into fuel line section 18A). The pressure regulator 24 preferably maintains fuel pressure in the engine fuel line 28 at the constant preselected amount of pressure above an intake manifold reference pressure. In most prior art systems, the fuel pressure regulator 24 is located at the engine with the electronic fuel injection system 14 downstream of the fuel injectors at the end of the fuel rail. Aspects of the invention can be carried out with the pressure regulator 24 located at the engine with the electronic fuel injection system 14 as known in the prior art, however, it is preferred that the pressure regulator 24 be isolated physically from the electronic fuel injection system 14 as described hereinafter.

A make-up fuel line 30 from the fuel tank 12 is connected to the water separating fuel filter 26. Both the return fuel line 18B containing the cooled, recirculated fuel stream from the pressure regulator 24 and the make-up fuel line 30 containing make-up fuel from the fuel tank 12 are connected to an upstream side of the water separating fuel filter 26. The cooled and recirculated fuel stream and the make-up fuel stream are combined together and filtered by flowing the streams through the water separating fuel filter 26. The combined filtered fuel stream flows from the fuel filter 26 into the main fuel line section 16A. Main fuel line section 16A is connected directly to the low-pressure side of the electric fuel pump 20. Notably, the fuel supply system 10 does not include a vapor separator. Rather, the fuel supply system 10 includes a fuel cooler 22 that maintains the temperature of fuel circulating and recirculating through the fuel supply loop 16A, 16B, 18A, and 18B at a temperature low enough that fuel vaporization is not likely in main fuel line section 16A at the low-pressure side of the fuel pump 20.

The fuel pump 20 is preferably a high-volume, high-pressure displacement type electric fuel pump. The displacement capacity of the fuel pump 20 is substantially greater than combustion requirements of the engine even at full throttle. In the embodiment of the invention shown in FIGS. 2–9, the fuel pump 20 has a displacement of about 55 gallons per hour. The maximum flow rate of fuel to the engine through the engine fuel line 28 is approximately 20 gallons per hour at full throttle. The fuel pump 20 thus provides more than twice as much fuel through the main fuel line 16A, 16B than is supplied to the engine through engine fuel line 28 at full throttle.

The displacement of the fuel pump 20 preferably does not vary with respect to engine speed or throttle position. The fuel pump 20 therefore displaces a substantially greater amount of fuel under all operating conditions than is supplied to the engine for combustion. At low speeds or idle, less fuel is provided to the engine 14 through engine fuel line 28, and therefore more fuel is pumped through the cooler 22 and recirculated through the plumbed fuel supply loop. Therefore, at idle, a large percentage of the stream of fuel flowing through the plumbed fuel supply loop (e.g. greater than 97%) continues to circulate and recirculate through the plumbed fuel supply loop 16A, 16B, 18A, and 18B, and is cooled repeatedly as the stream of fuel passes through the fuel cooler 22.

The fuel cooler 22 is designed to remove substantially more heat from the stream of fuel circulating and recirculating through the plumbed fuel supply loop 16A, 16B, 18A, and 18B than is added to the stream of fuel by heat dissipation in the fuel pump 20. In addition, the cooled stream of fuel that is circulated and recirculated through the plumbed fuel supply loop cools the other components located in the supply loop, i.e. fuel pump 20, fuel pressure regulator 24 and water separating fuel filter 26. Because of the higher flow rate of cooled recirculated fuel when the engine is at idle or operating at low speeds, the system 10 operates particularly well at idle and at low speeds to prevent fuel in the main fuel line section 16A at the low-pressure end of the pump 20 from vaporizing. The system 10 is also particularly effective at reducing vapor lock due to engine heat stoke after the engine has been shut down and restarted after a relatively short period of time, in part because the cooled recirculating fuel keeps the components 20, 22, 24, and 26 in the plumbed fuel supply loop 16A, 16B, 18A, 18B relatively cool. Thus, the components themselves are effective heat sinks, inasmuch as the components 20, 22, 24 and 26 can absorb a greater amount of heat without allowing the temperature to rise to levels in which vapor lock is likely. It may also be desirable to provide additional heat sinks in or adjacent to the components 20, 22, 24 and 26. In addition, as described with respect to FIGS. 2–10, the components 20, 22, 24, and 26 are preferably located low in the engine box 6 where surrounding air temperatures are substantially less. The components 20, 22, 24 and 26 should also be well insulated.

Figure 2:
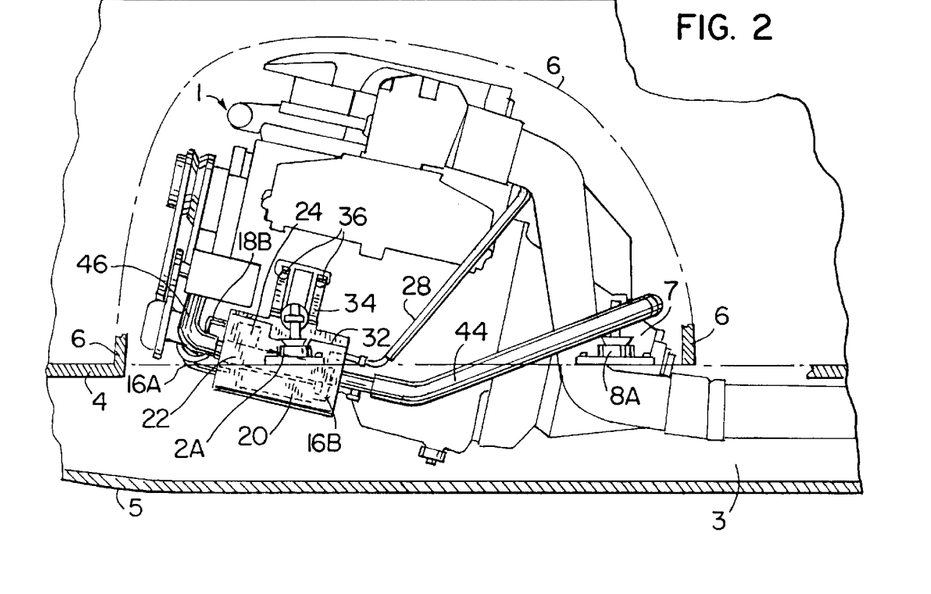
FIG. 2 is a left-hand side elevational view of a marine engine having a fuel supply system in accordance with the invention.
Figure 3:
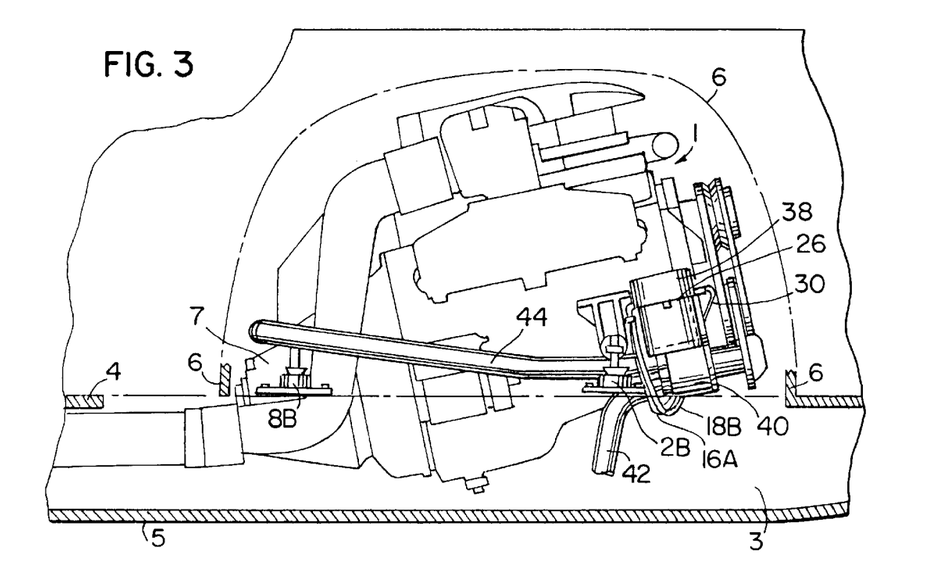
FIG. 3 is a right-hand side elevational view of a marine engine having a fuel supply system in accordance with the invention.

FIGS. 2–9 show a preferred embodiment of the fuel supply system 10 as mounted on a marine engine 1. Referring to FIGS. 2 and 3, the engine 1 is a multi-cylinder 4-cycle V style engine. The engine 1 is mounted in a mid-travel position to joists in a boat using engine mounting brackets 2A, 2B. Although the engine 1 is mounted in the mid-travel position in FIGS. 2 and 3, the invention is also well-suited for use on inboard/outboard marine propulsion systems. In FIGS. 2 and 3, a portion of the engine 1 lies in the bilge 3 between the floor 4 of the boat and the hull 5 of the boat. The upper portion of the engine 1 resides in an engine box 6 (only partially shown) which completely covers the upper portion of the engine 1. Temperature stratification between the bilge 3 and the top portion of the engine box 6 can be significant, especially on warm, sunny days (e.g. approximately a 150° temperature stratification). The transmission 7 is mounted inline with the engine crankshaft. The transmission is mounted to boat joists with the transmission mounts 8A, 8B.

FIG. 2 shows a first side of the engine block and FIG. 3 shows a second side of the engine block. An insulated packaging system 32 containing the fuel pump 20, the fuel cooler 22, and the pressure regulator 24 is mounted to the first side, FIG. 2, of the engine block via mounting bracket 34. Mounting bracket 34 is bolted to the engine block using mounting bolts 36. An insulated housing 38 containing the water separating fuel filter 26 is mounted to the second side, FIG. 3, of the engine block.

It is desirable to mount both the insulated packaging system 32 which contains the fuel pump 20, the fuel cooler 22 and the pressure regulator 24; and the insulated housing 38 which contains the water separating fuel filter 26 relatively low within the engine box 6. As shown in FIG. 2, at least a portion of the insulated packaging system 30 is located below the first engine mount 2A within the bilge 30 of the boat. As shown in FIG. 3, a portion of the insulated housing 38 containing the water separating fuel filter 26 is located below the second engine mount 2B. It is desirable to locate these components 32, 38 low in the engine box 6 where surrounding air temperatures are substantially less than towards the top of the box 6.

A conventional sea water pump 40 pumps sea water from a sea water inlet hose 42 to the engine for cooling purposes. The sea pump 40 is mounted to the second side, FIG. 3, of the engine 1. The sea water inlet hose 42 receives sea water from a conventional sea water pickup (not shown) mounted through the hull 5 or the transom of the boat, as is known in the art. Before the sea water pump 40 pumps cooling water to the engine, the sea water pump 40 pumps sea water through hose 44 to the fuel cooler 22 which is preferably a tube-in-tube heat exchanger. Sea water cools fuel flowing through the fuel cooler 22. After cooling the fuel in the fuel cooler 22, the sea water exits the fuel cooler 22 in hose 46 and flows to the engine to cool the engine block in the conventional manner.

Figure 4:
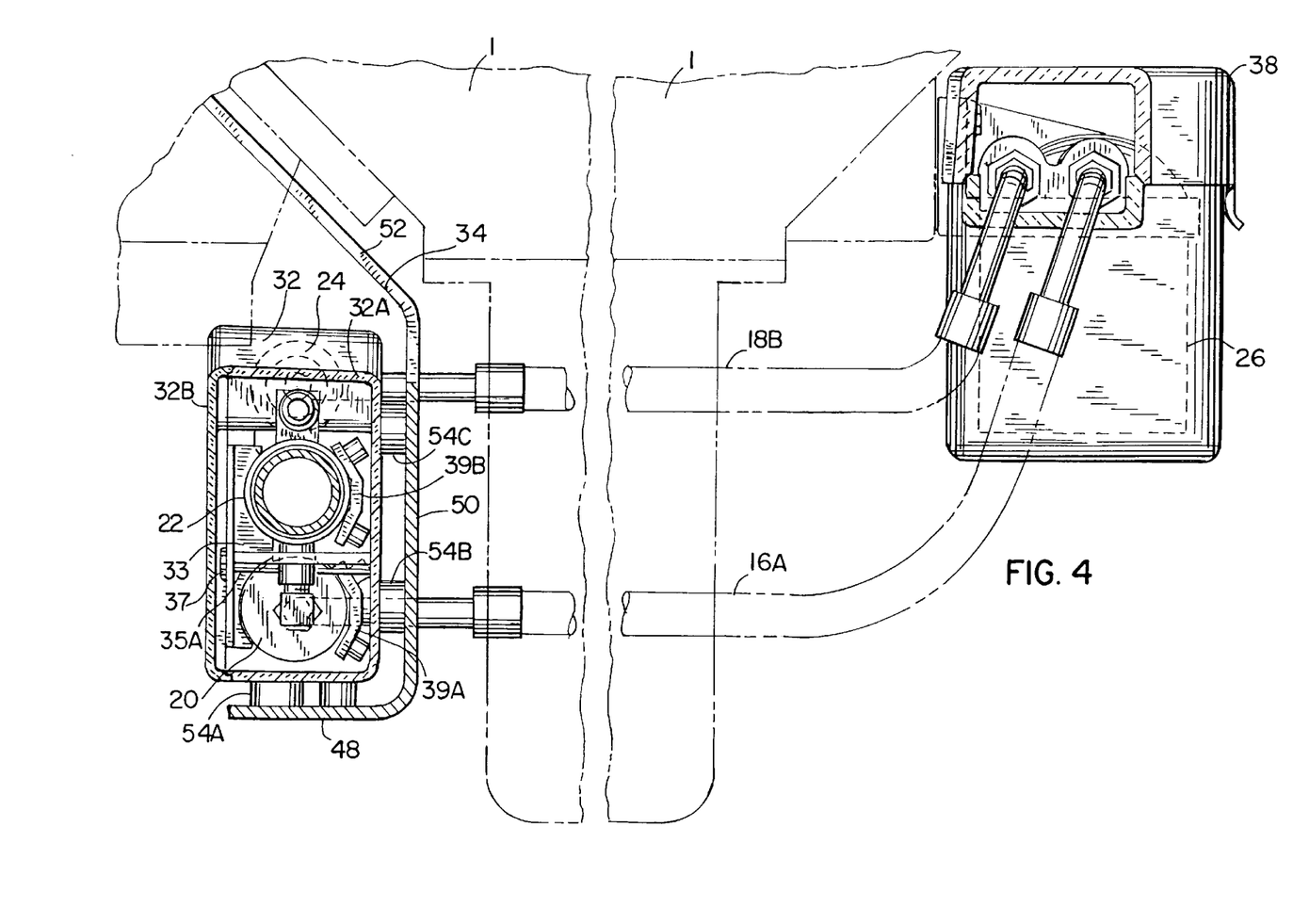
FIG. 4 is a schematic front view of the marine engine shown in FIGS. 2 and 3 illustrating in the preferred mounting configuration for the fuel supply system.

Referring now to FIG. 4, the fuel lines 16A and 18B are conventional fiberglass braided fuel lines having a teflon inner surface. It is desirable that fuel lines 16A and 18B be located low in the engine box 6. Therefore, it is preferred that the main fuel line section 16A and the return fuel line section 18B loop from the first side, FIG. 2, of the engine block, the second side, FIG. 3, of the engine block. In particular, it is desirable to pass the fuel line sections 18B and 16A below the lowermost height of the sea water pump 40, see FIG. 3.

Still referring to FIG. 4, the mounting bracket 34 for the insulated packaging system 32 containing the fuel pump 20, the fuel cooler 22 and the pressure regulator 24 includes three co-extensive plates: a horizontal lower plate 48, a vertical face plate 50 extending upward from the horizontal lower plate 48, and an upper plate 52 extending diagonally upward from a top edge of the vertical face plate 50. The insulated packaging system 32 and the components therein are mounted to the mounting bracket 34 using spacers 54A, 54B and 54C. The horizontal lower plate 48 passes underneath the insulated packaging system 32 and shields the bottom of the insulating packaging system 32. The shielding provided by the lower plate 48 is important for many reasons, including shielding the components within the insulated packaging system 32 from fire or the like. The vertical face plate 50 and the lower portion of the upper plate 52 shield the insulated packaging system 32 from radiant heat from the engine 1.

The insulated packaging system 32 includes 2 outer plastic shells 32A, 32B. The fuel pump 20 and the heat exchanger 22 are mounted within the plastic shells 32A, 32B of the insulated packaging system 32 horizontally. The heat exchanger 22 is packaged as close as reasonably possible in the vertical direction to the fuel pump 20. A brass mounting bracket 33 is used to mount the fuel pump 20 and the heat exchanger 22 tightly within the shells 32A, 32B of the insulated packaging system 32. A pair of mounting pillars 35A, 35B extend from the main shell 32A for the insulated packaging system 32. The brass bracket 33 is attached by tightening screws 37 through the brass bracket 33 into the respective mounting pillar 35A, 35B. Cradle type spacers 39A, 39B are located between the fuel pump 20 and the shell 32A and the heat exchanger 22 and the shell 32A, respectively. It is desirable to space the fuel pump 20 and the heat exchanger 22 from the shell 32A and 32B to improve heat insulating characteristics of the system.

The brass bracket 33 is unpainted and has substantial size. It is therefore an effective heat sink within the shells 32A, 32B of the insulated packaging system. When the engine is running, the brass bracket 33 is cooled along with the other components 20, 22, and 24 within the shells 32A, 32B. When the engine is shut down and cooling water and cooled fuel are no longer flowing through the system, the components within the fuel supply system absorb heat from the engine. The brass bracket heat sink 33 provides additional thermal mass within the shells 32A, 32B to absorb engine heat soak. It is typical for engine heat soaking to last no more than about an hour, after which time the engine itself becomes relatively cool, although various engines and fuel systems have different heat transfer characteristics. The size of the brass bracket heat sink 33 can be enlarged if necessary to ensure that there will not be an excessive temperature rise in the components 20, 22 and 24 located within the shells 32A, 32B until the engine would normally cool after being shut down.

The components 20, 22, 24, and 26 and the fuel lines 16A and 18B of the plumb fuel supply loop can be removed together in unison from the engine 1 easily by: disconnecting the engine fuel line 28; disconnecting the make-up line 30; disconnecting a reference pressure line for the pressure regulator 24; detaching the mounting bracket 34 for the insulated packaging system 32 containing the fuel pump 20, the fuel cooler 22, and the pressure regulator 24; and removing the water separating fuel filter 26 from the insulated housing 38. Therefore, it is convenient to remove the fuel supply system 10 and service the system 10 off of the engine.

Figure 5:
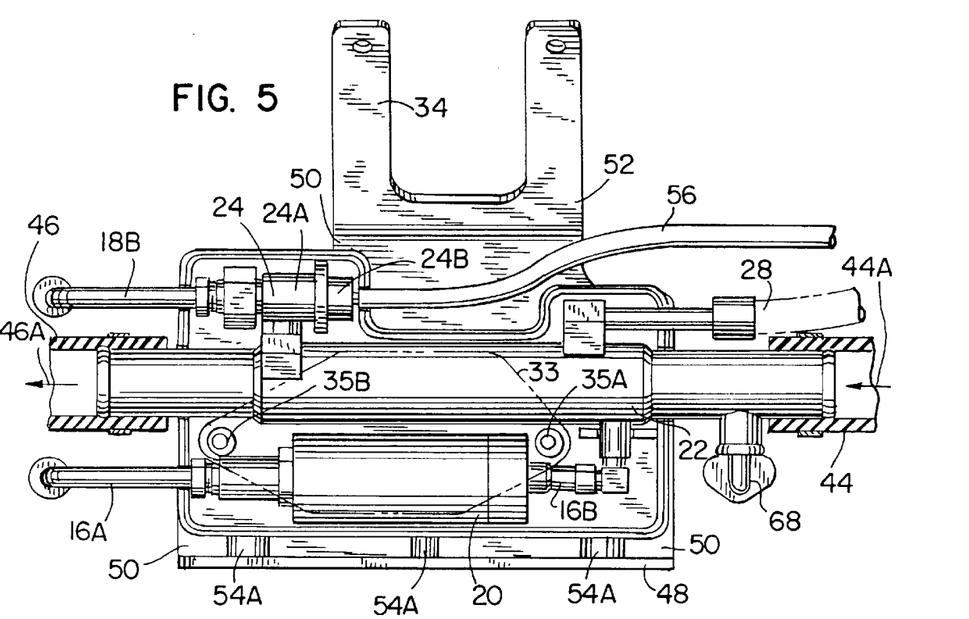
FIG. 5 is a view of the components of the fuel supply system as shown in FIG. 2.

Referring now to FIG. 5, the pressure regulator 24 is preferably a diaphragm operated relief valve with the fuel pump pressure on one side 24A, and regulator spring pressure and intake manifold pressure on the other side 24B. The intake manifold pressure is provided to side 24B of the pressure regulator 24 via intake manifold pressure line 56 which communicates with air flowing in through the intake manifold for the engine. The primary function of the pressure regulator 24 is to maintain a constant pressure difference across the fuel injectors over the various operating conditions of the engine. The pressure regulator 24 compensates for engine load by increasing fuel pressure in engine fuel line 28 to the electronic fuel injectors 14 as engine vacuum drops.

Figures 6, 7:
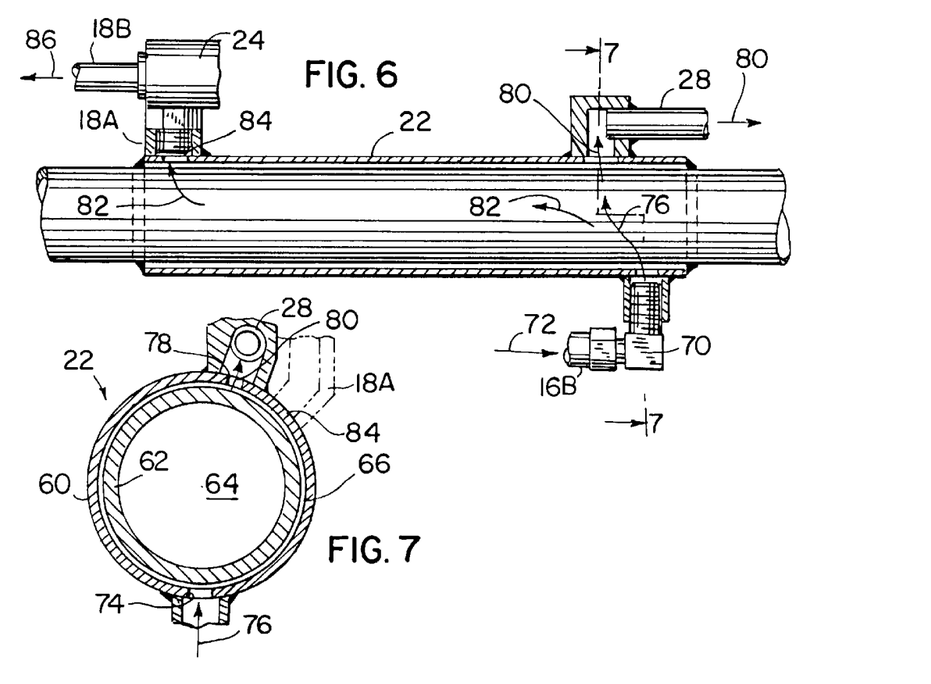
FIG. 6 is a fragmented view illustrating the flow path of a fuel stream through the components shown in FIG. 5.
FIG. 7 is a cross-sectional drawing taken along line 7—7 in FIG. 6.

Referring now to FIGS. 5–7, the preferred heat exchanger 22 is a tube-in-tube heat exchanger. The heat exchanger 22 has a cylindrical outer shell 60 and a coaxially located cylindrical inner tube 62. Cooling water flows through the passage 64 within the inner tube 62, and fuel flows through the annular space 66 between the outer housing 60 in the inner tube 62. In general, fuel and cooling water flow through the heat exchanger in the same longitudinal direction (i.e. a co-flow configuration). Cooling water flows into the heat exchanger 22 from cooling water hose 44 as illustrated by arrow 44A, FIG. 5. Some of the flow of cooling water flowing into the heat exchanger 22 bypasses the heat exchanger 22 through line 68. This bypass flow of cooling fluid may be used for several purposes, for example, cooling the engine exhaust manifold, etc. Except for the bypass cooling water, the cooling water flows through the heat exchanger 22 and exits into cooling water hose 46 as indicated by arrow 46A, FIG. 5.

Fuel in the main fuel line section 16A is pumped by the fuel pump 20 into main fuel line section 16B. An L-shaped fitting 70 connects the main fuel line section 16B to the heat exchanger 22. Fuel flows from the fuel pump 20 through main fuel line section 16B as depicted by arrow 72, FIG. 6, and through the fitting 70 into the heat exchanger 22 through an opening 74 in the outer cylindrical housing 60 of the heat exchanger 22 as depicted by arrow 76, FIGS. 6 and 7. The fuel injection portion of the fuel stream supplied to the heat exchanger 22 flows through a fuel supply opening 78 in the outer cylindrical housing 60 of the heat exchanger 22 and into the main fuel line 28, which is supplied to the engine electronic fuel injection system 14 as depicted by arrows 80, FIGS. 6 and 7. The remaining portion of the fuel stream is cooled by flowing the fuel through the annular space 66 between the inner tube 62 and the outer housing 60 of the heat exchanger 22 longitudinally along the length of the heat exchanger as depicted by arrows 82, FIG. 6. The cooled fuel stream, arrow 82, exits the heat exchanger 22 through a fuel recirculation opening 84 in the outer shell 60 of the heat exchanger 22, and flows through the pressure regulator 24 into the fuel return line section 18B as depicted by arrow 86, FIG. 6. A tube-in-tube heat exchanger 22, as shown and described in FIGS. 5–7, is desirable because the heat exchanger 22 provides little restriction to the flow of coolant through the heat exchanger 22. This is important because the coolant flows to cool the engine after exiting the heat exchanger 22. The diameter of the inner tube 62 of the heat exchanger 22 should be sufficiently large to eliminate significant flow restrictions. The amount of cooling required to adequately cool the fuel stream in the particular application can be easily accommodated by altering the longitudinal length of the heat exchanger 22.

It is preferred that the heat exchanger 22 be located downstream of the fuel pump 20, although it may be possible in some circumstances to locate the heat exchanger 22 upstream of the fuel pump 20. Because there can sometimes be substantial pressure drops for fuel flowing through the heat exchanger 22, locating the heat exchanger 22 upstream of the fuel pump 20 may in some circumstances actually promote vapor lock, unless the restriction to fuel flow through the heat exchanger is negligible.

Figure 8:
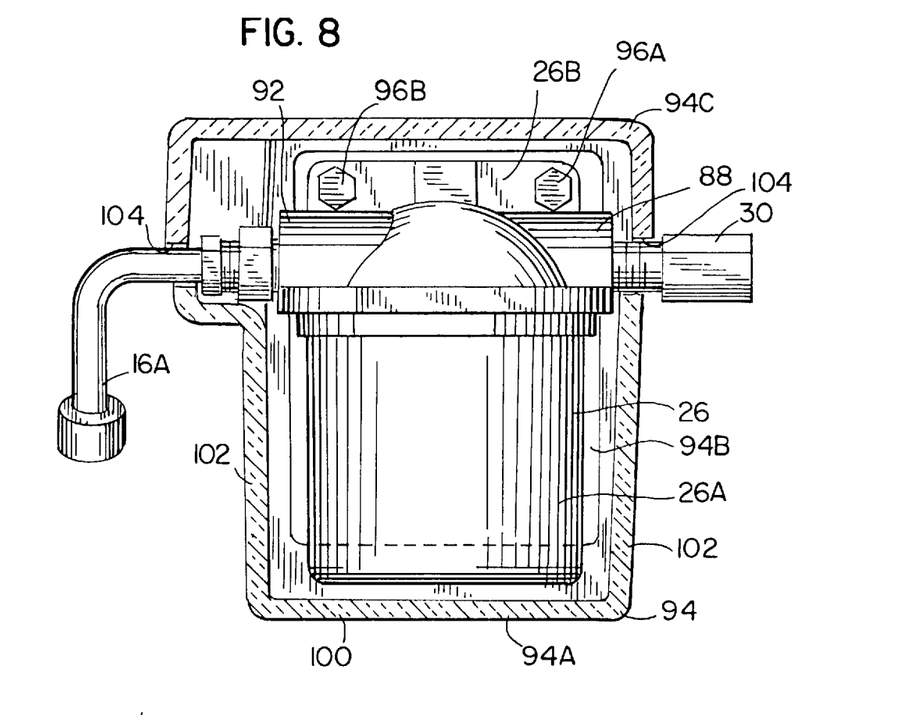
FIG. 8 is a detailed drawing of the components of the fuel supply system shown in FIG. 3.
Figure 9:
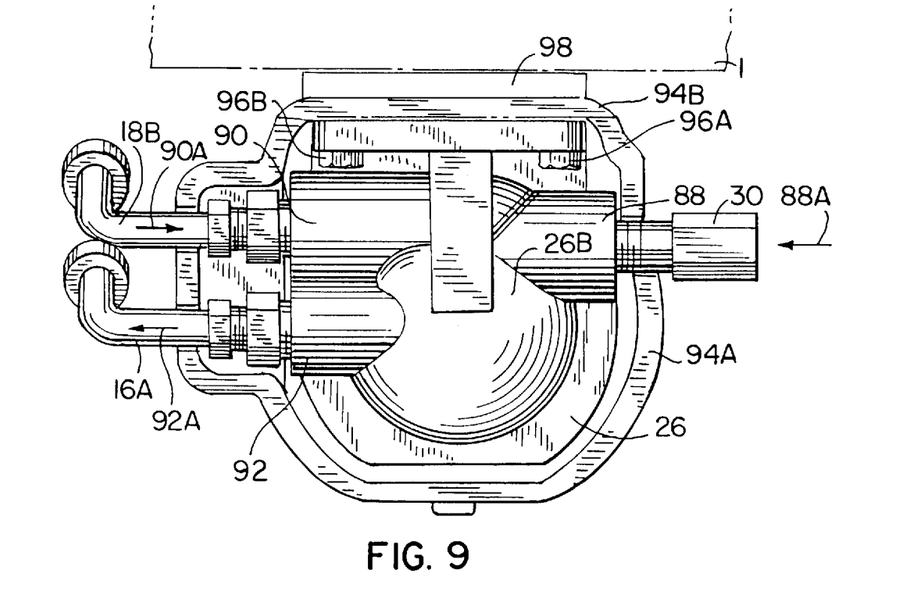
FIG. 9 is a top plan view of the components shown in FIG. 8 in which a top cover of an insulating housing has been removed.

FIGS. 8 and 9 illustrate the preferred embodiment of the water separating fuel filter 26 and its preferred manner of installation. The water separating fuel filter 26 consists of a filter base 26A and a filter mounting bracket 26B as is known in the art. The filter mounting bracket includes an inlet 88 for the make-up fuel line 30 into which make-up fuel from the fuel tank 12 may enter the water separating filter 26 as depicted by arrow 88A. The water separating filter mounting bracket 26B includes an inlet 90 to which the fuel return line section 18B connects so that recirculated fuel from the pressure regulator 24 may enter the water separating fuel filter 26 as depicted by arrow 90A. The water separating fuel filter mounting bracket 26B also includes an outlet 92 which is connected to the main fuel line section 16A so that filtered fuel may flow from the water separating fuel filter 26 to the fuel pump 20 as depicted by arrow 92A. Flowing fuel through the water separating fuel filter 26 promotes coalescing of any fuel vapor bubbles that may appear in the recirculated fuel stream from the pressure regulator 24 into liquid fuel.

The water separating fuel filter 26 is contained within a three part insulated housing 94 that is mounted to the engine 1. The purpose of the insulated housing 94 is to slow heat transfer from the engine to the water separating fuel filter 26, especially after the engine 1 is shut down, for the same reasons as previously described with respect to the insulated packaging system 32 containing the fuel pump 20, the fuel cooler 22, and the pressure regulator 24. Also, as previously explained, it is desirable to mount the water separating fuel filter to the engine as low as possible within the engine box 6. The water separating fuel filter 26 is mounted to the engine 1 using bolts 96A, 96B. The bolts 96A and 96B pass through the water separating fuel filter mounting bracket 26B, a back member 94B for the insulated housing 94, an insulating plate 98 made of a glass reinforced laminate, and are secured in the engine block 1.

The three part construction of the insulated housing 94 allows the water separating fuel filter 26 to be easily removed from the engine without having to detach the entire insulated housing 94 from the engine block 1. The three part insulated housing 94 includes a cup member 94A, a back member 94B, and a cap 94C. The cup member 94A includes a bottom wall 100 and a side wall 102 that extends substantially perpendicular upward from the bottom wall 100. The side wall 102 circumferentialy surrounds the water separating fuel filter 26 except for an open back side portion. The back member 94B, which is mounted to the engine, engages the cup member 94A and also covers the open back side portion of the insulating cup member 94. The cap 94C snap engages a top edge of the cup member 94A and a top edge of the back member 94B. Openings 104 are provided between the top edge of the cup member 94A and the cap 94C to allow passage of fuel lines 30, 18B, and 16A, respectively. With the three members 94A, 94B and 94C engaged to one another, the insulated housing 94 is sturdy.

However, insulated housing 94 can be easily disassembled to provide access to the water separating fuel filter 26 by removing the cap 94C, and then removing the cup member 94B.

Figure 10:
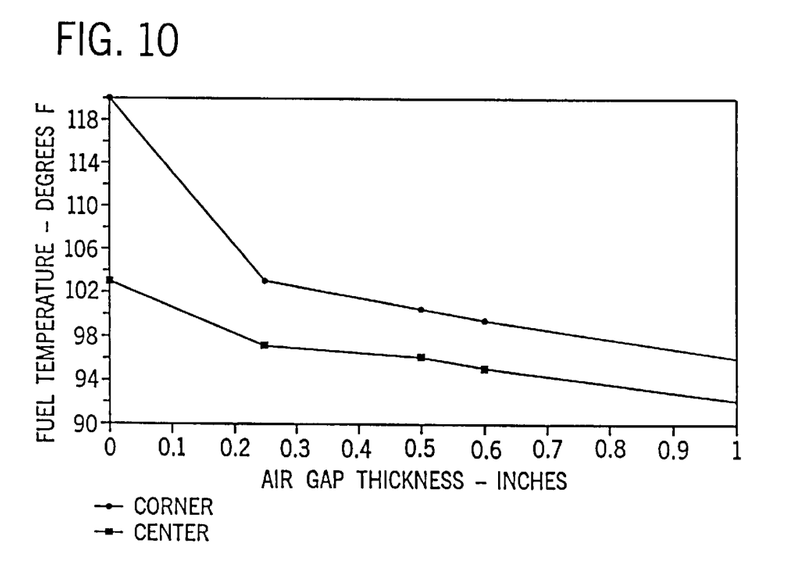
FIG. 10 is a plot illustrating the effect of air gap thickness when insulating the component of the fuel supply system shown in FIGS. 8 and 9.

In order to promote proper heat insulation of the water separating fuel filter 26 within the insulated housing 94, it is important that a sufficient gap of air exists between the water separating fuel filter 26 and the insulating cup member 94. FIG. 10 illustrates test results of temperature extremes for the water separating fuel filter 26 over a period of 90 minutes within a 130° F. environment with respect to various air gap thicknesses. As can be seen from FIG. 10, it is preferred that the air gap thickness be 0.5 inches or greater, and the air gap should not be less than 0.2 inches.

Various alternatives, modifications and equivalents may be apparent to those skilled in the art. The following claims should be considered to cover such variations, modifications or equivalents.

We claim:

1. In a marine propulsion system, a method of supplying fuel from a main fuel tank to an internal combustion engine comprising the steps of:

providing a plumbed fuel supply loop through which a stream of fuel flows, continuously pumping the stream of fuel flowing through the plumbed fuel supply loop with a fuel pump, the fuel pump displacing a relatively fixed volume of liquid fuel;

cooling the fuel stream flowing through the plumbed fuel supply loop with a fuel cooler;

supplying a fuel injection portion of the fuel stream flowing through the plumbed fuel supply loop to the engine for combustion, the amount of the fuel injection portion under all operating conditions being substantially less than the amount of fuel pumped by the fuel pump;

recirculating a remaining portion of the fuel stream which is not supplied to the engine for combustion through the plumbed fuel supply loop at a location in the plumbed fuel supply loop upstream of the fuel pump and cooler;

providing make-up fuel from a main vehicle fuel tank to replenish the recirculated fuel stream flowing through the plumbed fuel supply loop;

providing the replenished recirculated fuel stream through the plumbed fuel supply loop to a low-pressure side of the fuel pump without accumulating the replenished recirculated fuel stream in a vapor separator; and filtering the fuel stream flowing through the plumbed fuel supply loop through a water separating fuel filter at a location in the plumbed fuel supply loop upstream of the fuel pump and downstream of the location where the remaining portion of the fuel stream that was not supplied to the engine is recirculated through the plumbed fuel supply loop and also downstream of the location where the make-up fuel is provided to replenish the recirculated fuel flow through the plumbed fuel supply loop.

2. In a marine propulsion system, a method of supplying fuel from a main fuel tank to an internal combustion engine comprising the steps of:

providing a plumbed fuel supply loop through which a stream of fuel flows;

continuously pumping the stream of fuel flowing through the plumbed fuel supply loop with a fuel pump, the fuel pump displacing a relatively fixed volume of liquid fuel;

cooling the fuel stream flowing through the plumbed fuel supply loop with a fuel cooler;

supplying a fuel injection portion of the fuel stream flowing through the plumbed fuel supply loop to the engine for combustion, the amount of the fuel injection portion under all operating conditions being substantially less than the amount of fuel pumped by the fuel pump;

recirculating a remaining portion of the fuel stream which is not supplied to the engine for combustion through the plumbed fuel supply loop at a location in the plumbed fuel supply loop upstream of the fuel pump and cooler;

providing make-up fuel from a main vehicle fuel tank to replenish the recirculated fuel stream flowing through the plumbed fuel supply loop;

providing the replenished recirculated fuel stream through the plumbed fuel supply loop to a low-pressure side of the fuel pump without accumulating the replenished recirculated fuel stream in a vapor separator; and wherein the fuel stream flowing through the plumbed fuel supply loop is cooled downstream of the fuel pump and upstream of the location in which the fuel injection portion of the fuel stream is supplied to the engine for combustion.

3. A method as recited in claim 2 further comprising the step of:

regulating the pressure of the fuel injection portion of the fuel stream supplied to the engine for combustion using a pressure regulator.

4. A method as recited in claim 2 wherein:

the fuel cooler is a heat exchanger that receives an engine cooling fluid before the engine cooling fluid is used to cool the engine; and the fuel stream is cooled by passing the fuel stream through the heat exchanger.

5. A method as recited in claim 2 wherein:

the fuel cooler is a heat exchanger;

the fuel stream is cooled by passing the fuel stream through the heat exchanger; and the heat exchanger uses sea water flowing through the heat exchanger to absorb heat from the fuel stream.

6. In a marine propulsion system, a method of supplying fuel from a main fuel tank to an internal combustion engine comprising the steps of:

providing a plumbed fuel supply loop through which a stream of fuel flows:

continuously pumping the stream of fuel flowing through the plumbed fuel supply loop with a fuel pump, the fuel pump displacing a relatively fixed volume of liquid fuel;

cooling the fuel stream flowing through the plumbed fuel supply loop with a fuel cooler;

supplying a fuel injection portion of the fuel stream flowing through the plumbed fuel supply loop to the engine for combustion, the amount of the fuel injection portion under all operating conditions being substantially less than the amount of fuel pumped by the fuel pump;

recirculating a remaining portion of the fuel stream which is not supplied to the engine for combustion through the plumbed fuel supply loop at a location in the plumbed fuel supply loop upstream of the fuel pump and cooler;

providing make-up fuel from a main vehicle fuel tank to replenish the recirculated fuel stream flowing through the plumbed fuel supply loop;

providing the replenished recirculated fuel stream through the plumbed fuel supply loop to a low-pressure side of the fuel pump without accumulating the replenished recirculated fuel stream in a vapor separator; and insulating the fuel pump and the fuel cooler from engine generated heat by placing the fuel pump and the fuel cooler within a common heat insulating structure.

7. A method as recited in claim 6 further comprising the step of:

providing an additional heat sink in conjunction with the heat insulating structure used to insulate the fuel pump and the fuel cooler, the heat sink being cooled by the fuel cooler when the engine is operating and absorbing engine generated heat when the engine is not operating.

8. A method as recited in claim 3 further comprising the step of:

insulating the pressure regulator from engine generated heat by placing the pressure regulator within a heat insulating structure.

9. A method as recited in claim 1 further comprising the step of:

insulating the water separating fuel filter from engine generated heat by placing the water separating fuel filter within a heat insulating structure.

10. A method as recited in claim 3 wherein the pressure of the fuel injection portion of the fuel stream supplied to the engine is maintained at a preselected amount of over a reference intake manifold pressure.

11. In a marine propulsion system having an internal combustion engine mounted to joists in a boat and covered by an engine box, a method of supplying fuel to the engine from a boat fuel tank comprising the steps of:

providing a plumbed fuel supply loop through which a stream of fuel flows;

continuously pumping the stream of fuel flowing through the plumbed fuel supply loop with a fuel pump that displaces a relatively fixed volume of liquid fuel from a low-pressure side of the pump to a high-pressure side of the pump;

filtering the fuel stream flowing through the plumbed fuel supply loop through a water separating fuel filter upstream of the fuel pump;

cooling the fuel stream flowing through the plumbed fuel supply loop downstream of the fuel pump;

supplying a fuel injection portion of the fuel stream flowing through the plumbed fuel supply loop to the engine for combustion, the amount of the fuel injection portion under all operating conditions being substantially less than the amount of fuel pumped by the fuel pump;

regulating the pressure of the fuel injection portion of the fuel stream flowing to the engine for combustion;

recirculating a remaining portion of the fuel stream which is not supplied to the engine for combustion through the plumbed fuel supply loop at a location upstream of the water separating fuel filter; and providing make-up fuel from the boat fuel tank to the water separating fuel filter to replenish the recirculated fuel stream flowing through the plumbed fuel supply loop.

12. A fuel supply system for an internal combustion engine comprising:

a fuel tank;

a plumbed fuel supply loop including a main fuel line and a return fuel line;

a high-volume, high-pressure fuel pump located in the main fuel line that continuously pumps a stream of fuel through the plumbed fuel supply loop, the fuel pump displacing a relatively constant volume of fuel;

a heat exchanger that cools the stream of fuel flowing through the plumbed fuel supply loop;

means for supplying a fuel injection portion of the fuel stream flowing through the plumbed fuel supply loop to the engine for combustion, the amount of the fuel injection portion under all operating conditions being substantially less than the amount of fuel pumped by the fuel pump;

a pressure regulator located in the plumbed fuel supply loop downstream of the fuel pump that regulates the pressure of the fuel injection portion of the fuel stream flowing to the engine for combustion;

a return fuel line connected to the pressure regulator that recirculates a remaining portion of the fuel stream that is not supplied to the engine for combustion to the plumbed fuel supply loop upstream of the fuel pump and upstream of the heat exchanger; and means for providing make-up fuel from the fuel tank to the fuel stream flowing through the plumbed fuel supply loop to replenish the recirculated fuel stream;

a water separating fuel filter that receives recirculated fuel from the fuel return line and outputs filtered fuel to the main fuel line at a location upstream of the fuel pump; and wherein said means for providing make-up fuel from the fuel tank comprises a fuel tank supply line that supplies fuel from the fuel tank directly to an upstream side of the water separating fuel filter.

13. A fuel supply system for an internal combustion engine comprising:

a fuel tank;

a plumbed fuel supply loop including a main fuel line and a return fuel line, a high-volume, high-pressure fuel pump located in the main fuel line that continuously pumps a stream of fuel through the plumbed fuel supply loop, the fuel pump displacing a relatively constant volume of fuel;

a heat exchanger that cools the stream of fuel flowing through the plumbed fuel supply loop:

means for supplying a fuel injection portion of the fuel stream flowing through the plumbed fuel supply loop to the engine for combustion, the amount of the fuel injection portion under all operating conditions being substantially less than the amount of fuel pumped by the fuel pump:

a pressure regulator located in the plumbed fuel supply loop downstream of the fuel pump that regulates the pressure of the fuel injection portion of the fuel stream flowing to the engine for combustion;

a return fuel line connected to the pressure regulator that recirculates a remaining portion of the fuel stream that is not supplied to the engine for combustion to the plumbed fuel supply loop upstream of the fuel pump and upstream of the heat exchanger;

means for providing make-up fuel from the fuel tank to the fuel stream flowing through the plumbed fuel supply loop to replenish the recirculated fuel stream;

a water separating fuel filter that receives recirculated fuel from the fuel return line and outputs filtered fuel to the main fuel line at a location upstream of the fuel pump.

14. A fuel supply system as recited in claim 13 wherein the fuel return line is connected directly to an upstream side of the water separating fuel filter.

15. A fuel supply system as recited in claim 13 further comprising a heat insulated housing that contains the water separating fuel filter, the heat insulating housing being mounted to the engine.

16. A fuel supply system as recited in claim 15 wherein the insulated housing comprises:

an insulating cup member including a bottom wall and a side wall that is substantially perpendicular to the bottom wall and circumferentially surrounds the water separating fuel filter except for an open backside portion corresponding to a backside of the water separating fuel filter facing the engine;

an insulating back member that engages the insulating cup member and covers the open backside portion of the insulating cup member, the insulating back member being mounted to the engine; and an insulating cap that engages a top edge of the insulating cup member and a top edge of the insulating back member.

17. A fuel supply system as recited in claim 16 wherein an air gap of at least 0.20 inches exists between the water separating fuel filter and the insulating cup member of the insulated housing.

18. A fuel supply system for an internal combustion engine comprising:

a fuel tank;

a plumbed fuel supply loop including a main fuel line and a return fuel line;

a high-volume, high-pressure fuel pump located in the main fuel line that continuously pumps a stream of fuel through the plumbed fuel supply loop, the fuel pump displacing a relatively constant volume of fuel;

a heat exchanger that cools the stream of fuel flowing through the plumbed fuel supply loop;

means for supplying a fuel injection portion of the fuel stream flowing through the plumbed fuel supply loop to the engine for combustion, the amount of the fuel injection portion under all operating conditions being substantially less than the amount of fuel pumped by the fuel pump;

a pressure regulator located in the plumbed fuel supply loop downstream of the fuel pump that regulates the pressure of the fuel injection portion of the fuel stream flowing to the engine for combustion;

a return fuel line connected to the pressure regulator that recirculates a remaining portion of the fuel stream that is not supplied to the engine for combustion to the plumbed fuel supply loop upstream of the fuel pump and upstream of the heat exchanger;

means for providing make-up fuel from the fuel tank to the fuel stream flowing through the plumbed fuel supply loop to replenish the recirculated fuel stream;

an insulated packaging system that contains the fuel pump and the heat exchanger and insulates the fuel pump and heat exchanger from engine generated heat.

19. A fuel supply system as recited in claim 18 wherein the insulated packaging system further contains the pressure regulator, and also insulates the pressure regulator from engine generated heat.

20. A fuel supply system as recited in claim 18 further comprising an additional heat sink that is contained within the insulated packaging system.

21. A fuel supply system as recited in claim 18 further comprising a bracket that attaches the insulated packaging system to the engine, the bracket including a lower plate that extends underneath a bottom surface of the insulated packaging system and shields the bottom surface of the insulated packaging system.

22. A fuel supply system as recited in claim 21 wherein the bracket further includes a face plate and an upper plate to shield the insulated packaging system from radiant heat from the engine, the face plate extending vertically upward from the lower plate and the upper plate extending diagonally upward from a top edge of the face plate.

23. A fuel supply system as recited in claim 18 further comprising an insulated housing which contains a water separating fuel filter.

24. A fuel supply system as recited in claim 23 wherein the engine has a V style engine block and the fuel pump and heat exchanger within the insulated packaging system are mounted to a first side of the V style engine block and the water separating fuel filter within the insulated housing is mounted to a second side of the V style engine block.

25. A fuel supply system as recited in claim 24 wherein:

the main fuel line is connected to a downstream side of the water separating fuel filter and the fuel return line is connected to an upstream side of the water separating fuel filter;

a sea water pump is mounted to the engine; and the main fuel line and the fuel return line loop from the second side of the V style engine block to the first side of the V style engine block by passing below a lowermost height of the sea water pump.

26. A fuel supply system as recited in claim 24 wherein:

the insulated packaging system further contains the pressure regulator;

the main fuel line is connected between a downstream side of the water separating fuel filter and an upstream side of the fuel pump;

the return fuel line is connected between a downstream side of the pressure regulator and an upstream side of the water separating fuel filter; and the insulated packaging system containing the fuel pump, the heat exchanger and the pressure regulator and the water separating fuel filter contained in the insulated housing are removable from the engine block without disconnecting the main fuel line from the water separating fuel filter or the fuel pump or disconnecting the return fuel line from the pressure regulator or the water separating fuel filter.

27. A fuel supply system as recited in claim 24 wherein:

the first side of the V style engine block includes a first engine mount that is used to mount the first side of the engine block to a mounting bracket attached to the boat and the second side of the V style engine block includes a second engine mount that is used to mount the second side of the engine block to a mounting bracket that is attached to the boat; and at least a portion of the insulated packaging system containing the fuel pump and the heat exchanger is located below the first engine mount and at least a portion of the insulated housing containing the water separating fuel filter is located below the second engine mount.

28. In a marine propulsion system having an internal combustion engine mounted to joists in a boat and covered by an engine box, a fuel supply system comprising:

a fuel tank;

a plumbed fuel supply loop including a main fuel line and a return fuel line;

a high-volume, high-pressure fuel pump that pumps a stream of fuel continuously through the plumbed fuel supply loop, the fuel pump receiving fuel from the main fuel line and displacing a relatively constant volume of fuel;

a heat exchanger that cools the fuel stream flowing through the plumbed fuel supply loop at a location in the fuel supply loop downstream of the fuel pump;

an electronic fuel injection system for the engine;

an engine fuel supply line that supplies a fuel injection portion of the fuel stream flowing through the plumbed fuel supply loop to the electronic fuel injection system;

a pressure regulator that regulates the pressure of the fuel injection portion of the fuel stream supplied to the electronic fuel injection system through the engine fuel supply line;

a fuel return line that recirculates the remaining portion of the fuel stream that is not supplied to the electronic fuel injection system to the fuel supply loop wherein the amount of the fuel injection portion under all operating conditions is substantially less than the amount of fuel pumped by the fuel pump;

a make-up fuel line from the fuel tank through which fuel is supplied from the fuel tank to replenish the recirculated fuel stream; and a water separating fuel filter that receives fuel flowing through the fuel return line and fuel flowing through the make-up fuel line, and outputs fuel into the main fuel line.

* * * * *